US006275309B1

United States Patent
Hu et al.

(10) Patent No.: US 6,275,309 B1
(45) Date of Patent: Aug. 14, 2001

(54) LIGHTWEIGHT MOBILE SCANNERS

(75) Inventors: Darwin Hu; Alpha Hou, both of San Jose; Dongtai Liu, Fremont; Chengrong Lu, San Jose, all of CA (US)

(73) Assignee: Syscan, Inc., San Jose, CA (US)

( * ) Notice: Subject to any disclaimer, the term of this patent is extended or adjusted under 35 U.S.C. 154(b) by 0 days.

(21) Appl. No.: 09/154,395

(22) Filed: Sep. 16, 1998

(51) Int. Cl.[7] .................................................. H04N 1/024

(52) U.S. Cl. ........................................... 358/473; 382/313

(58) Field of Search ................................ 358/473, 497, 358/400, 474, 450, 465, 475; 250/234, 235, 208; 382/313, 315, 312

(56) References Cited

U.S. PATENT DOCUMENTS 6,054,707 * 4/2000 Hou ........................................ 250/234

OTHER PUBLICATIONS http://www.tujitsu.co.jp/hypertext/news/1998/Jan/22–e.html Press release at tujitsu web site.

* cited by examiner

Primary Examiner—Jerome Grant, II
Assistant Examiner—Negussie Worku
(74) Attorney, Agent, or Firm—Joe Zheng

(57) ABSTRACT

It is disclosed that a mobile scanner includes only the minimum components to operate as a scanner. The disclosed scanner does not have a separate power supply to energize the components to work. Further, unlike many scanners in the market, there is not a single microcontroller in the disclosed mobile scanner while the performance thereof could outperform those scanners commanded traditionally by a microcontroller in the scanners. The disclosed scanner is coupled by an interface engine to a computing device that provides system control signals and power supply. The interface engine comprises a control circuit providing logic control signals to the scanner to operate in response to the system control signals. As such, the scanner is of high performance and low cost and so lightweight that it can be used in any conditions.

22 Claims, 11 Drawing Sheets

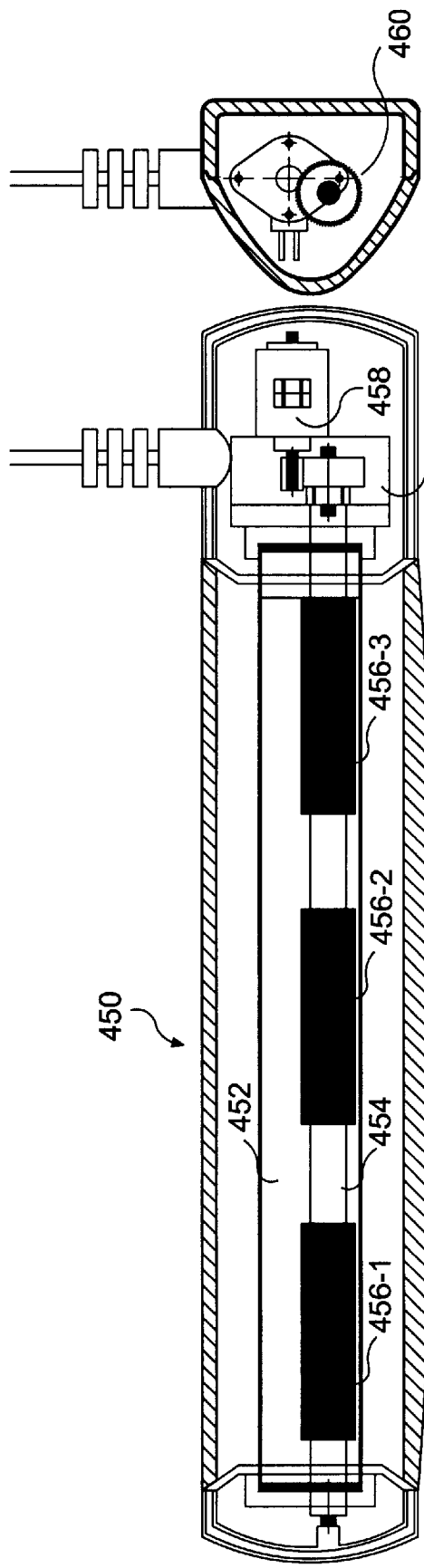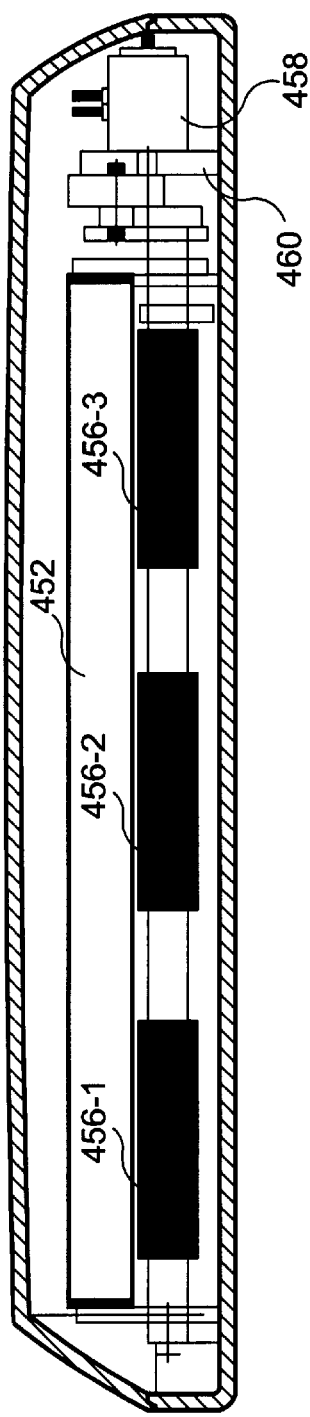

LIGHTWEIGHT MOBILE SCANNERS

BACKGROUND OF THE INVENTION

1. Field of the Invention

The present invention generally relates to a scanning system and more particularly relates to a mobile scanner that itself does not have any computing resources and is not energized by a separate power, wherein the operation of the mobile scanner is supported from a computing device and further capable of scanning both transparent and opaque materials.

2. Description of the Related Art

There are many applications that need optical scanners to convert paper-based objects, such as texts and graphics, to an electronic format that can be subsequently analyzed, distributed and archived. One of the most popular optical scanners is flatbed scanners that convert scanning objects, including pictures and papers, to images that can be used, for example, for building World Wide Web pages and optical character recognition. Another popular optical scanner is what is called sheet-fed scanners that are small and unobtrusive enough to sit between a keyboard and a computer monitor or integrated into a keyboard to provide a handy scanning means. Most optical scanners are referred to as image scanners as the output thereof is generally in digital image format.

With the increasing popularity of notebook computers, there is an emerging need for scanners that are even smaller to be carried around like an accessory to the notebook computers. For example, a journalist goes far away from a news bureau to collect information about an important event there. It is considerably useful if a portable or mobile scanner can be used to scan documents on site into a computer that then forwards the electronic versions to the news bureau for immediate news reporting or archival. In the applications like the news reporting, handheld scanners have been used in the past. To be compact, many of the handheld scanners are manually operated, namely a user has to hold a handheld scanner over a scanning document to move from one end to another end so as to scan in the entire scanning document. However, the quality of images is not always satisfactory, typically suffering from jittered motions of the manual operations.

With the emergence of sheet-fed scanners, such as those Paper Port series from Visioneer Inc., handheld scanners are gradually replaced by the sheet-fed scanners. Because a sheet-fed scanner operates automatically, namely a scanning document is well controlled to pass through an image sensor in the sheet-fed scanner, the resultant images are generally satisfactory.

The current sheet-fed scanners in the market are standalone devices whereas they generally operate with a computer. In addition to an image sensor, an illumination source and a motion mechanism, a typical sheet-fed scanner has a microcontroller, memory, post-processing circuitry and interface circuitry. Further to energize all the parts in the scanner to work, there is an external power adapter converting a high AC voltage to a low DC voltage. With all the parts together, a sheet-fed scanner is indeed a self-contained system having an interface to a computing system.

Generally there is a microcontroller in the sheet-fed scanners that controls and operates all the parts to work in synchronization. To reduce the cost of a scanner, the microcontroller in use is typically an 8-bit microprocessor, for example, 8088 from Intel, which is considered nowadays a primitive processor in light of available 32-bit or even 64-bit microprocessors. The overall system performance is thus severely limited by the performance of an 8-bit microprocessor. It is a dilemma of having either a low-cost/low performance scanner or a high-cost/high-performance scanner. There is therefore a great need for a scanner that is low-cost/high-performance. Further there is another need for a scanner that is compact and light weight enough to be truly portable.

In many cases, there is a need to convert transparent objects, such as negative or positive films, transparencies for an overhead projector or X-ray films, into images so that the information in the transparent objects can be, for example, electronically analyzed, distributed or archived. The conversion is currently done through a specially designed film scanner, often bulky and run by a separate service. There is further still another need for mobile scanners that are capable of scanning not only the regular papers but also the transparent materials. The demand for mobile scanners with the dual-scanning capability is ever increasing in both consumer and business markets.

SUMMARY OF THE INVENTION

The present invention has been made in consideration of the above described problems and needs. The disclosed invention, for the first time, provides a mobile scanner that has only the minimum components to operate. The disclosed scanner does not have a separate power supply to energize the components to work. Further, unlike many scanners in the market, there is not a single microcontroller in the disclosed scanner while the performance thereof could outperform those scanners commanded traditionally by a microcontroller. The benefits and advantages of the disclosed scanner includes high performance but low cost and is so lightweight that it can be used in any conditions.

According to one aspect of the present invention, the scanner itself comprises only an image sensing module and a motion mechanism. The image sensing module, including a one-dimensional image sensor, an optical system and a first illumination source, is responsible for imaging a scanning object and the motion mechanism is responsible for moving the scanning document to pass through the image sensing module at a steady speed. Both of the image sensing module and the motion mechanism are coupled to an interface engine that is typically received in a computing device. The interface engine comprises a control circuit that receives system control signals from the computing device and generates logical control signals for the image sensing module and the motion mechanism to operate in synchronization. Further the interface engine draws a power supply from the computing device to energize the image sensing module and the motion mechanism to operate.

According to another aspect of the present invention, the disclosed scanner comprises two demountable cases. The main case houses the image sensing module and the motion mechanism and the base case houses a second illumination source. The first illumination source in the image sensing module provides front illumination to an opaque scanning object while the second illumination source provides back illumination to a transparent scanning object, as such the disclosed scanner is capable of scanning both opaque and transparent materials, a dual scanning feature that has been long sought in the scanning market.

Accordingly, one of the objects in the present invention is to provide a mobile scanner that is of high performance and low cost and so lightweight that it can be used in any conditions.

Other objects, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIGS. 4D to 4F show respectively three different views of the internal structures of a mobile scanner according to one embodiment;

DETAILED DESCRIPTION OF THE PREFERRED EMBODIMENTS

Figure 1:
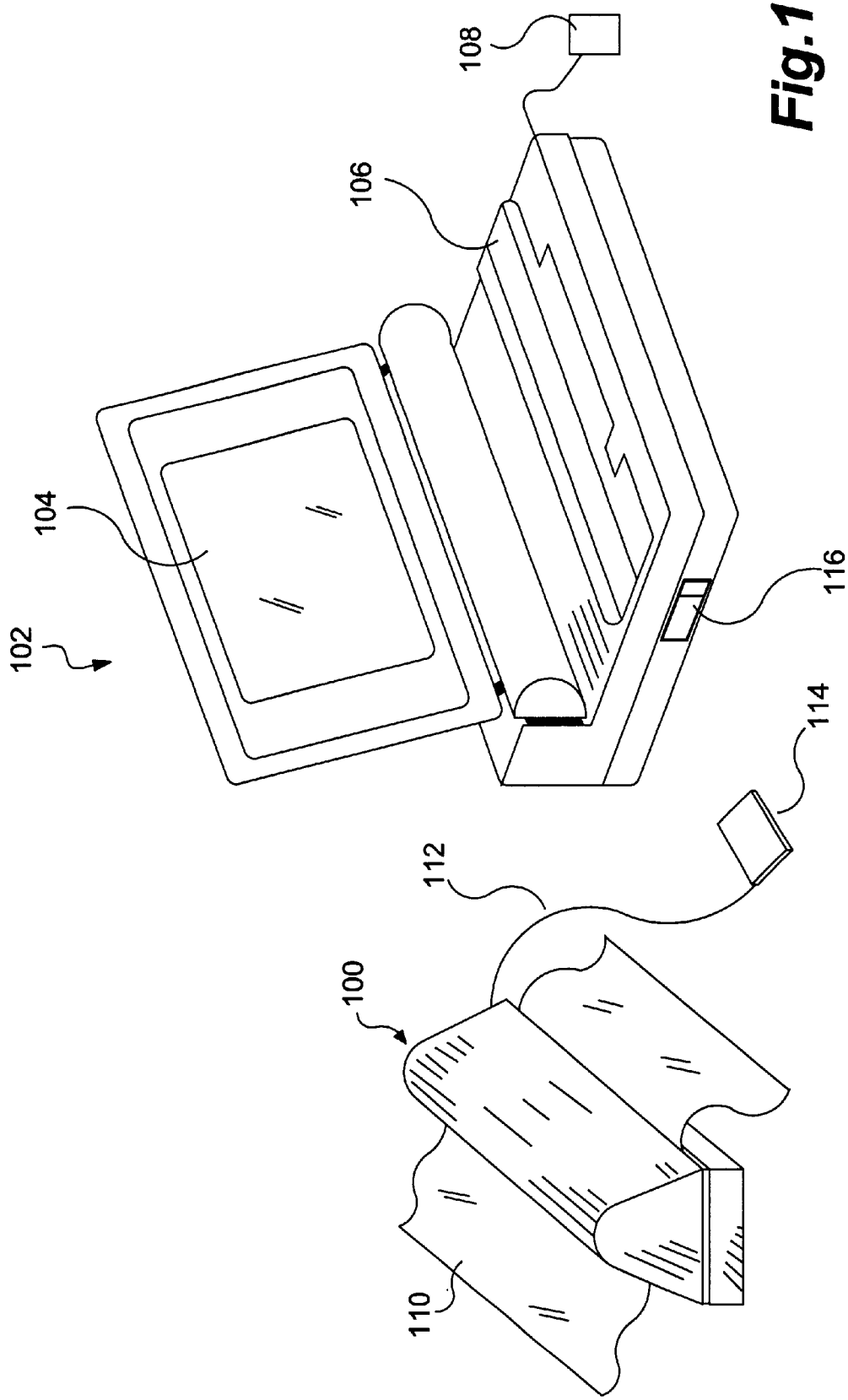
FIG. 1 shows a schematic configuration in which the present invention may be practiced.

Referring now to the drawings, in which like numerals refer to like parts throughout the several views. FIG. 1 shows a schematic configuration in which the present invention may be practiced. Mobile scanner 100 is connected, through a communication cable 112 to an interface engine housed in a card 114. Computing device 102 which may be an IBM PC or PC-compatible notebook computer includes a receptacle or socket 116 coupled to the PC bus and controlled by the microcontroller in the computing device. The microcontroller is typically a powerful 32-bit microprocessor such as Petium II from Intel Corporation.

When the interface card 114 is received in the receptacle 116, not only does the interface engine receive a power supply from the computing system, typically 5V, but also becomes integrated into the computing system, receiving system control signals from the powerful microprocessor. Through communication cable 112 and the interface engine, mobile scanner 100 can communicate with computing device 102. Further computing device 102 operates an application program preferably under a windows operating system, for example, Microsoft Windows 98. The application program, as will be described in more detail below, is a compiled and linked version of a process that controls the operations of mobile scanner 100 via the interface engine housed in a card 114.

Scanner 100 scans, line by line, a scanning object 110, such as a piece of paper or film with text and graphics on it. The scanning result, which is typically a digital representation of scanning object 110, is transferred to computer 102 through communication cable 112 and interface card 114. The digital representation may be converted by the application program to a standard image format such as TIFF (Tag Image File Format) or BMP (Bitmap File Format), that may be manipulated for desired visual effects by another application program, such as PhotoShop 5.0 from Adobe Systems, Inc.. The digital representation or manipulated digital image can be displayed on display monitor 104.

Computing device 102 is further provided with a floppy disk drive (not shown) with which removable floppy disk media may be read or written, fixed disk drive (not shown) for storing image files and application program files, a keyboard 106 for permitting input of text data, such as titles and names for scanned image files, and a pointing device 108 such as a mouse or the like which is also provided to permit execution of commands, for example, to display the scanned object and manipulated images thereof on display monitor 104.

Figure 2:
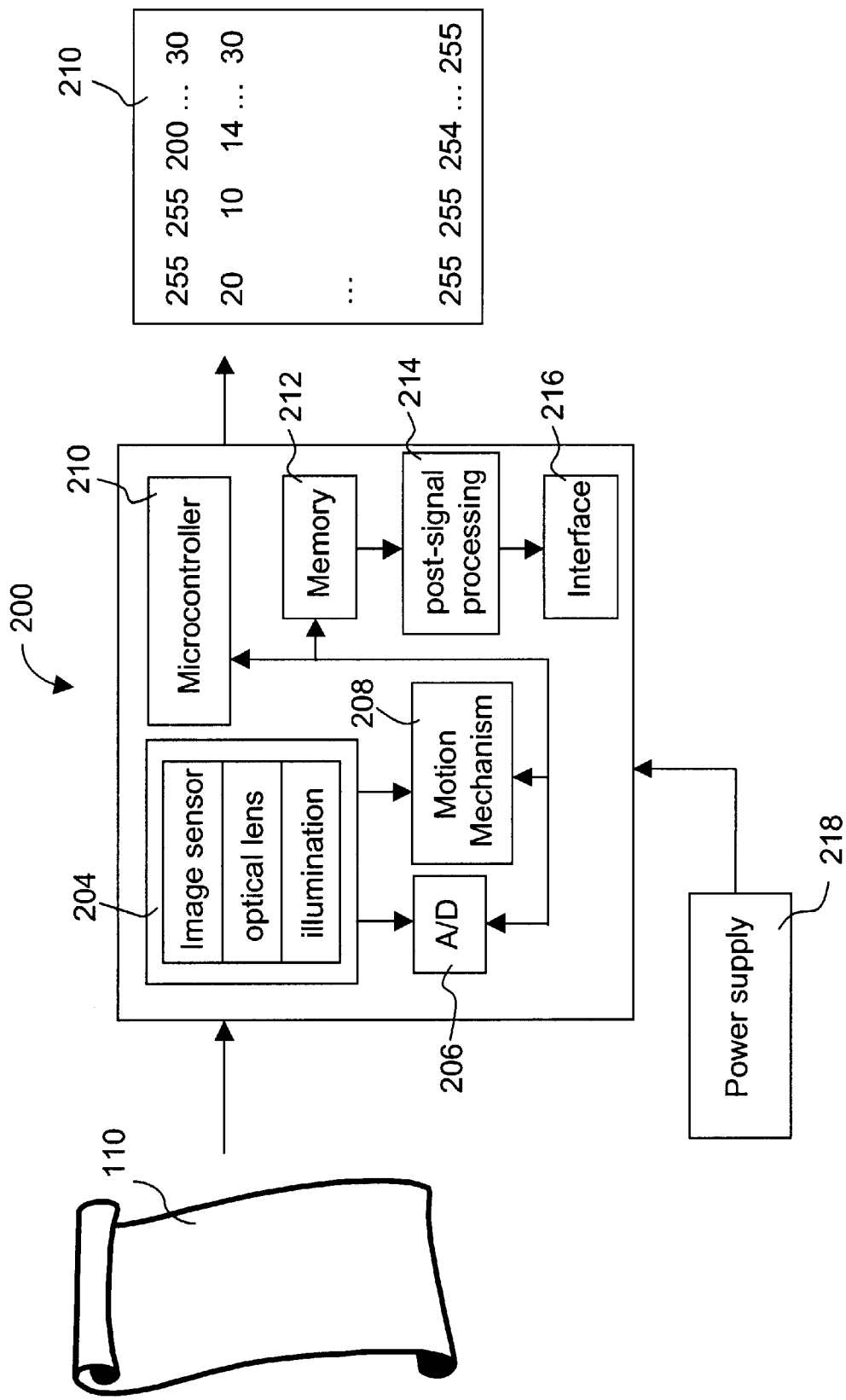
FIG. 2 shows a systemic diagram of a prior art scanner that converts a paper-based scanning object to a corresponding digital image.

FIG. 2 shows a systemic diagram of a prior art scanner 200 that converts a paper-based scanning object 110 to a corresponding digital image 202. Scanner 200 comprises an image sensing module 204, an analog-to-digital circuitry 206, a motion mechanism 208, a microcontroller 210 and memory 212. Motion mechanism 208 controlled by microcontroller 210 works in synchronization with image sensing module 204 such that image sensing module 204 images scanning object 110 while scanning object 110 is passing through image sensing module 204 at a steady speed.

Image signals from image sensing module 204 are then digitized by analog-to-digital circuitry 206 to produce digital signals (raw data) representing scanning object 110. To have a common interface with most of the computing devices, scanner 200 further comprises a post-signal processing circuitry 214 and an interface 216. Post-signal processing circuitry 214 generally performs digital signals enhancement and often presents the digital signals in a standard image format, such as TIFF or BMP. Interface 216 prepares the images for real-time transmissions through a standard interface, such as IEEE RS-232, via a serial port to a computing device. In addition, power supply 218, typically heavy and bulky, is provided to scanner 200 to energize all the parts in scanner 200 to operate.

Figure 3:
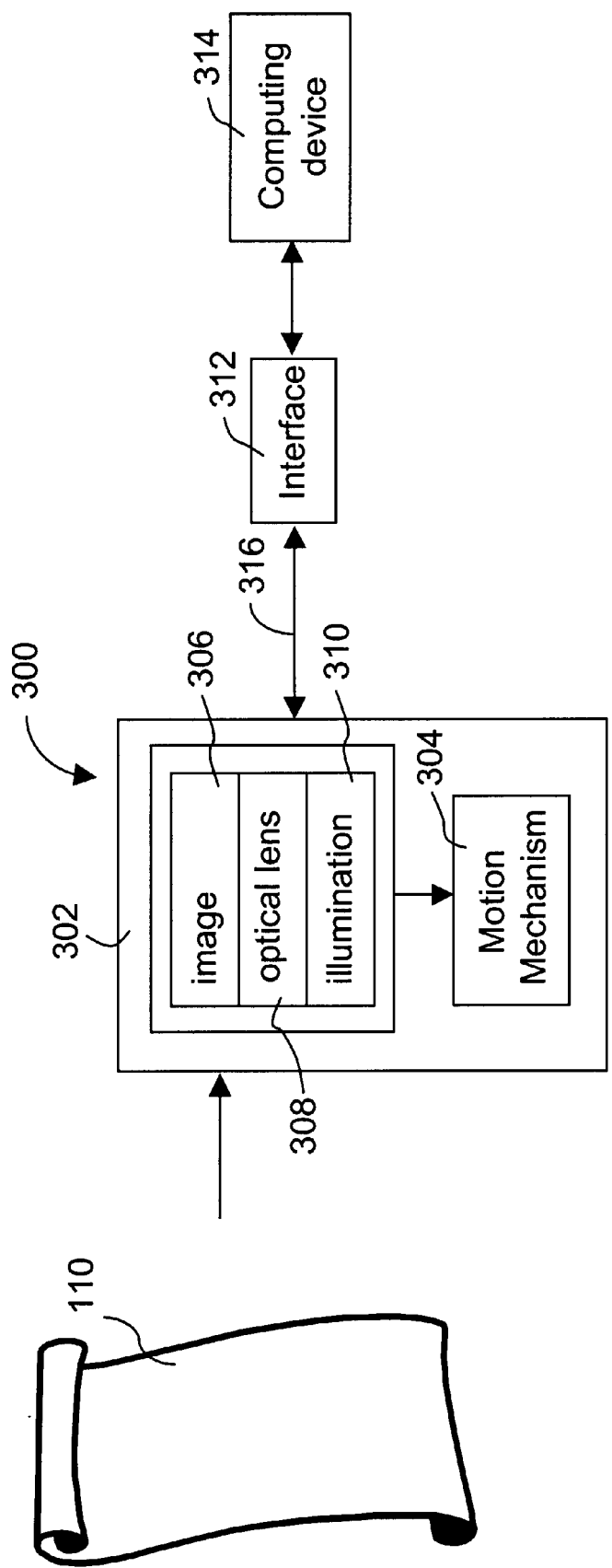
FIG. 3 illustrates a block diagram of a mobile scanner according to one embodiment of the present invention.

Referring now to FIG. 3, there is shown a block diagram of a mobile scanner 300 according to one embodiment of the present invention. Mobile scanner 300 comprises only two of many parts in scanner 200 of FIG. 2. The only two parts are an image sensing module 302 and a motion mechanism 304. It should be noted that there is no separate power supply to energize image sensing module 302 and motion mechanism 304 to work. The elimination of a separate power will considerably reduce the overall weight and size of a scanner. As will be further described below, the power to image sensing module 302 and motion mechanism 304 is "borrowed" from computing device 314 with which scanner 300 operates.

Image sensing module 302 comprises an image sensor 306, an optical lens 308 and an illumination system 310. Preferably, image sensor 306 is an array of Complementary Metal-Oxide Semiconductor (CMOS) photodetectors, each producing a charge signal when being exposed to incident light. Generally, the number of photodetectors in the array depends on the maximum size of a scanning document the scanner is designed to accommodate and the resultant image resolution. For example, a regular paper has a size of 8.5×11 inches. For 300 dpi (dot per inch) resolution, the number of photodetectors is 9×300=2,700 wherein 0.5 inch is added to account for a margin of the 8.5-inch width.

Optical lens 308 collects incident light from a scanning object illuminated by illumination source 304 onto image sensor 306, thereby an image of the scanning object is produced. Motion mechanism 304, known in all scanners, is responsible for moving the scanning object through image sensor 306 so that the entire scanning object can be scanned.

Figure 4A:
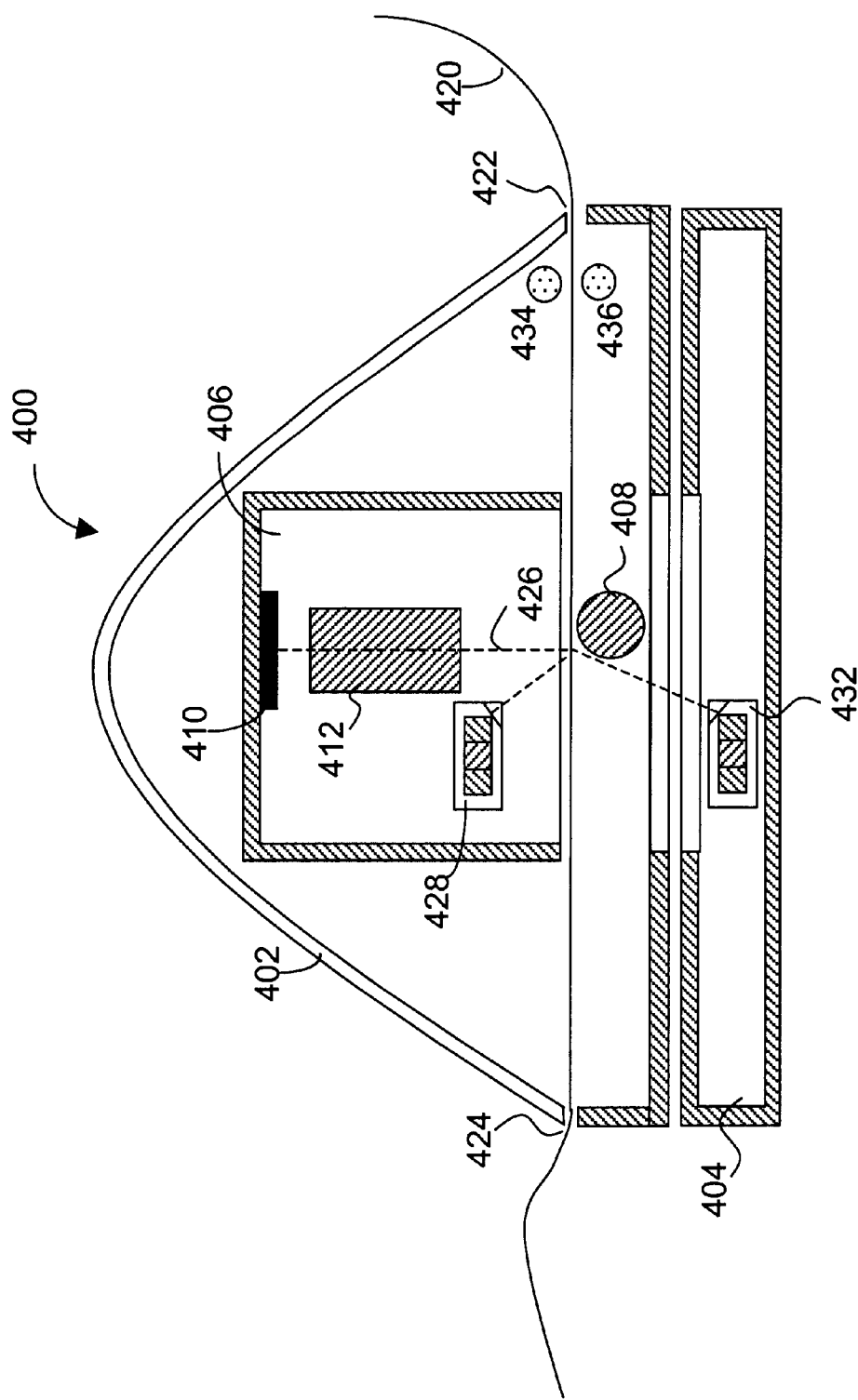
FIG. 4A shows a cross-section view of a mobile scanner that may correspond to the one shown in FIG. 1.

According to one embodiment of the present invention, both image sensing module 302 and motion mechanism 304 are housed in a compact case that can be made of a kind of light but rigid plastic material. FIG. 4A shows a cross-section view of a mobile scanner 400 according to the present invention and mobile scanner 400 may correspond to mobile scanner 100 of FIG. 1.

As shown in the figure, scanner 400, appearing rounded triangle shaped, comprises two demountable portions, a main case 402 and a base case 404, both preferably made of an identical material. Main case 402 houses an image sensing module 406 and motion mechanism of which only a rubber surfaced rod 408 is shown. A scanning object 420 is received from receiving opening 422, then moved by moving rod 408 to pass an optical path 426 and exited from exiting opening 424. When scanning object 420 passes optical path 426, scanning object 420 is illuminated by front illumination source 428, reflected light from scanning object 420 is collected by lens 412 and focused upon image sensor 410. It is noticed that illumination source 428 is referred to as front illumination source because it provides front illumination to a scanning object that is opaque. In other words, when scanning object 420 is transparent, no reflected light can be collected from the scanning object illuminated by illumination source 428.

Base case 404 comprises a second illumination source 432 which provides back illumination and can be removably mounted to main case 402 when there is a need to scan a scanning object that is transparent. The transparent sheet-like scanning object may include negative or positive films, transparencies for an overhead projector or X-ray films.

Figure 4B:
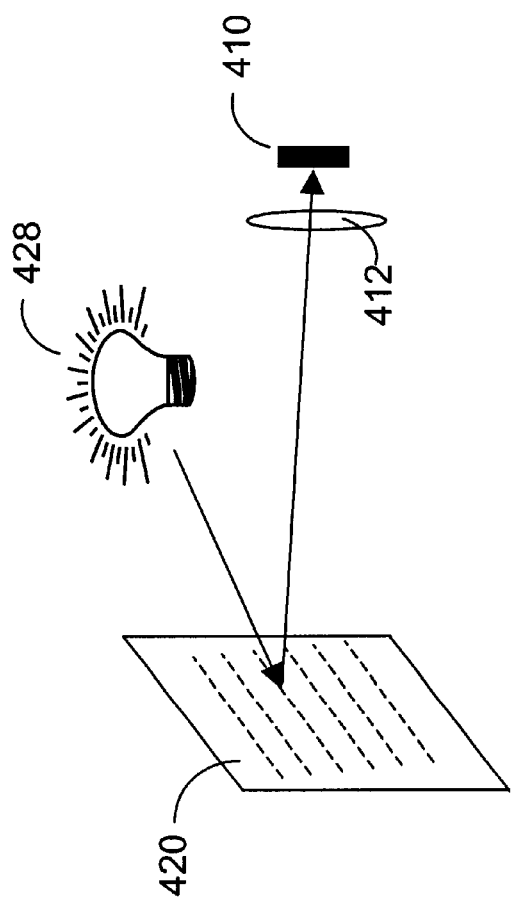
FIG. 4B and FIG. 4C depict respectively a pictorial view of front illumination and back illumination with respect to an image sensor.
Figure 4C:
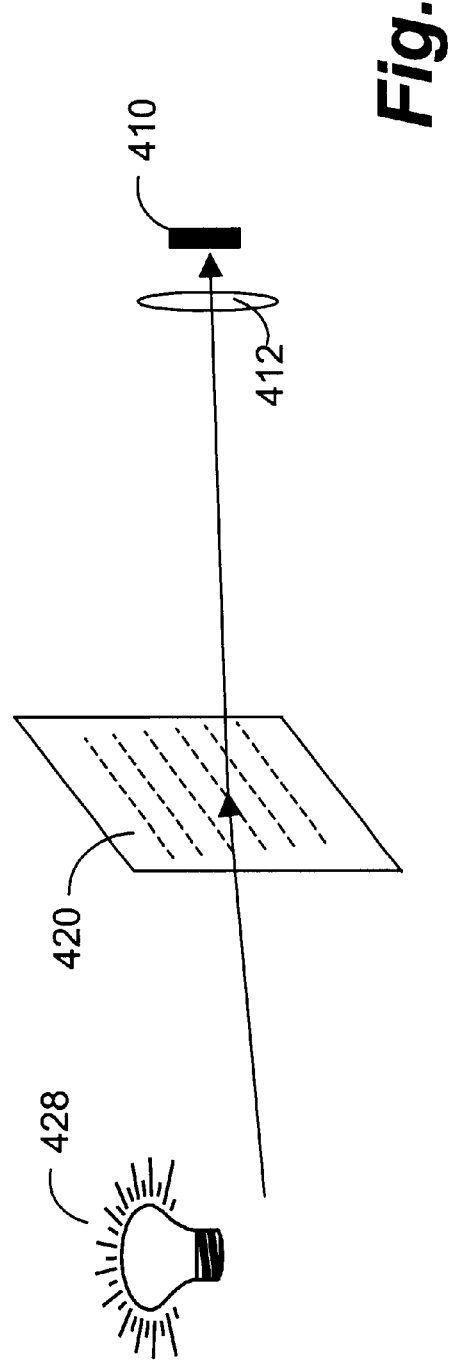

FIG. 4B and 4C demonstrate respectively the front illumination for an opaque scanning object and the back illumination for a transparent scanning object from the perspective of optics. In FIG. 4B, scanning object 420 is an opaque scanning material, such as a piece of paper, having a front surface facing to image sensor 410. Front illumination source 410 illuminates the front surface of scanning object 420, light reflected from the surface is collected by optical lens 412 and focused upon image sensor 410 so that an image of the surface is obtained. In FIG. 4B, scanning object 420 is a transparent scanning material, such as a piece of film. Back illumination source 432 provides illumination from the back of transparent scanning object 420 such that light transmitted through transparent scanning object 420, namely transmitted light, is collected by optical lens 412 and focused upon image sensor 410 so that an image of the transparent scanning object is obtained.

It should be pointed out that base module 404 is one of the distinctive features of the present invention. With base module 404 mounted to main module 402, mobile scanner 400 is capable of scanning both transparent and opaque scanning document. Typically, a user uses main module 402 for scanning paper-sheet materials in which case illumination source 428 provides front illumination to the materials passing through optical path 426. When the user decides to scan transparent materials, base module 404 can be mounted onto main module 402, in which case illumination source 432 is on to provide back illumination to the transparent materials. Those skilled in the art understand that a switch can be placed on the bottom of main module 402, the switch is so designed that it can be automatically turned on to switch the power supplied to illumination source 428 to illumination source 432 when base module 404 is mounted to main module 402.

Accordingly to another embodiment of the present invention, a pair of light source (emitter) 434 and photodetector 436 are used to detect if scanning object 420 is opaque or transparent. Preferably, light source 434 and photodetector 436 are aligned so that photodetector 436 is always activated by light source 434. When an opaque sheet is received from receiving opening 422, photodetector 436 becomes inactivated because of the blocked light source 434 by the opaque sheet. A control circuit, not shown in the figure and understood to those skilled in the art, can automatically turn on front illumination source 304. Similarly, when a transparent sheet is inserted into the scanning gap, photodetector 436 remains activated because light source 434 can go through the transparent sheet. Therefore the same control circuit can automatically turn on back illumination source 432.

Returning now to FIG. 3, interface engine 312 provides an interface between image sensing module 302 and computing device 314. For simplicity, connection lines throughout the figures shown as a solid line are representations of multiple lines or cables where appropriate. It can be appreciated by those skilled in the art that connection line 316 is a multiple-line cable. The power to make both image sensing module 302 and motion mechanism 304 to work is provided through cable 316 by interface engine 312 that draws the power from computing device 314. This is another one of the distinctive features of the present invention. In the prior art systems, a power adapter has to be used to energize image sensing module 302 and motion mechanism 304 while the power is gained from computing device 314 via interface engine 312 in the present design.

According to one embodiment, interface engine 312 is so designed and implemented in a PC Card (previously known as a PCMCIA card). The PC Card is based on standards published by the Personal Computer Memory Card International Association (PCMCIA), an industry group organized in 1989 to promote standards for both memory and I/O integrated circuit cards. A PC Card is also viewed a credit card-size memory or I/O device that fits into a personal computer, usually a notebook or laptop computer. As a result, PC users can be assured of standard attachments for any peripheral device that follows the standard.

For completeness, FIGS. 4D to 4F illustrate a top view, a side view and a front view of the internal structure of main module 402. Elongated part 452 corresponds to image sensing module 406 of FIG. 4A and includes an image sensor, a (front) illumination source and a rod lens array. Shaft 454 including one or more rubber-surfaced tube 456 is rotated by a motor 458 through a gearbox 460. When a scanning object, not shown, is inserted into the scanner, motor 458 causes shaft 454 to rotate at a speed adjusted by gear box 460 and the scanning object is then carried along by rubber surfaced tube 456 to move against elongated part 452 so that the image sensor therein can image the scanning object completely. It should be pointed out that, fundamentally different from the scanners in the market, there is no microcontroller and other electronic components in main module 402 to control the operation of the image sensor and the illumination source. The overall system performance of the scanner is not fixed rather depending on a host computer with which the scanner is coupled to operate.

Figure 5:
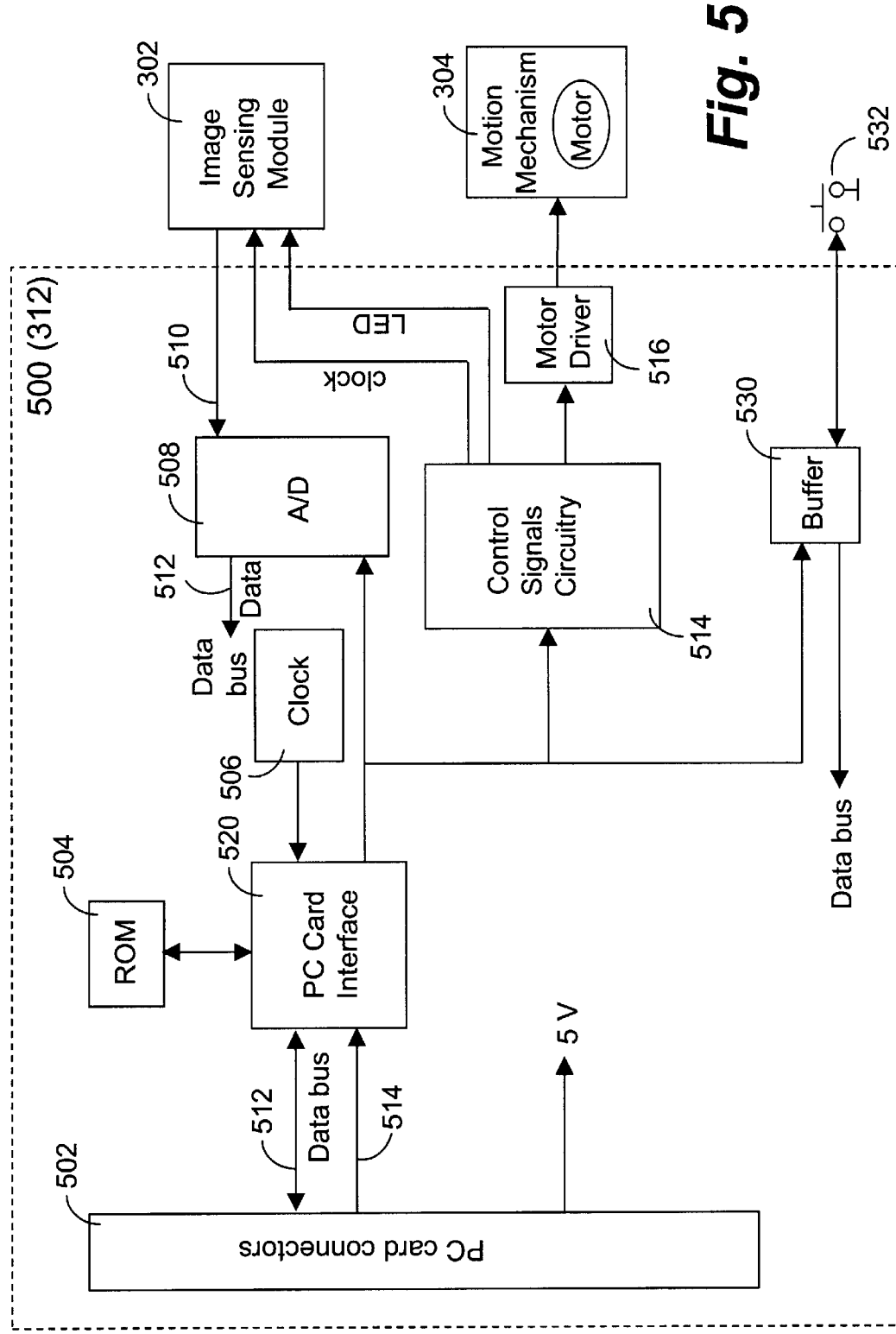
FIG. 5 shows an internal block diagram of an interface engine implemented in a PC Card that may be used in present invention to couple the scanner to a computing device.

Referring now to FIG. 5, there is shown an internal block diagram of interface engine 500 implemented in a PC Card. PC Card Connectors 502 is an array of standard pins, typically there are 68 pins. Each of the pins is functionally assigned according to the PCMCIA standards. One of the pins draws a 5-volt power 504 from a computing device to energize interface engine 500 to work when the computing device receives interface engine (card) 500 in its receptacle or interface engine (card) 500 is plugged into one of the bus slots in the computing device. The 5-volt power is further provided through cable 316 to image sensing module 302 and motion mechanism 304 of FIG. 3 to work.

Read Only Memory (ROM) 504 provides information to the computing device what functions or procedures interface card 500 performs and what system resources (I/O, IRQ, etc) it requires. Clock 506, typically an oscillator circuit, provides a central clocking signal to all the parts in interface card 500 to work in synchronization.

According to one embodiment, image sensing module 302 outputs analog signals generated from the charge signals in the photodetectors of the image sensor when image sensor is impinged with incident light (reflected or transmitted light). The analog signals are received by an analog-to-digital (A/D) converter 508 through an analog signal line 510 and the resultant digitized (digital) signals are uploaded to the computing device via data bus 512. The illumination source in the image sensing module 302 is controlled and synchronized by control signals from control signals circuitry 514 that operates under system control signals from the computing device via PC Card connectors 502. Typically, the illumination source comprises three primary colored lights, such as red, green and blue. To reproduce a color image, three primary color intensity images must be obtained. In other words, A/D converter 508 receives three analog signals respectively for each of the colored lights and produces respectively three digital signals.

The control signals from control signals circuitry 514 ensures that only one of the three lights is "ON" at one time for a specific period and each of the lights is successively turned on. Similarly, to ensure that motion mechanism 304 to operate in synchronization with image sensing module 302, motor drive 516 receives control signals from control signals circuitry 514. It is understood to those skilled in the art that control signals circuitry 514 is controlled by system control signals 514 generated from the computing device via PC Card connector 502 and comprises many logic circuits so as to generate control signals with different timings. As will be explained below, the system control signals are generated in the computing device that operates an application program, the application program implementing a process that uses the computing device to ultimately controls the operation of the scanner. Upon receiving the system control signals, PC Card Interface 520, which typically an ASIC circuit, produces interface control signals to synchronize all parts in the interface engine. With respect to the interface control signals, control signals circuitry 514 generates a set of scanner control signals.

Each of the scanner control signals is used to synchronize the operation of a particular part. For example, three illumination control signals are generated to control the operation of the illumination source comprising the three colored lights. The timing in the illumination control signals is so designed that only one of the lights is turned on for a specific period at one time and the three lights are successively turned on. Similarly sensor control signals and motor control signals are generated with respect to the illumination control signals so that the image sensing module and the motion mechanism can work harmoniously to produce images of scanning objects.

Optionally, there is one protection control signal from control signals circuitry 514 to motor driver 516. The protection control signal is used to protect a motor in motion mechanism 304. For example, in the middle of scanning a document, one of the parts in the interface engine 500 malfunctions, the protection control signal can immediately cause motor drive 516 to stop the operation of the motor in motion mechanism 304.

Buffer 530 communicating with PC Card connector 502 also receives interface control signals from decoder and register 520. Buffer 530 is primarily used to operate a switch means 532 for the computing device to operate accordingly. For example, switch means 532 is a control circuit for the pair of light source (emitter) 434 and photodetector 436 of FIG. 4, optionally switch means 532 is a manual button which upon being pressed, the scanner starts the scanning process, or further switch means 532 can control alternatively the front illumination and back illumination. Those skilled in the art can appreciate the utilities of switch means 532 and understand the detailed implementation according to the need.

Figure 6:
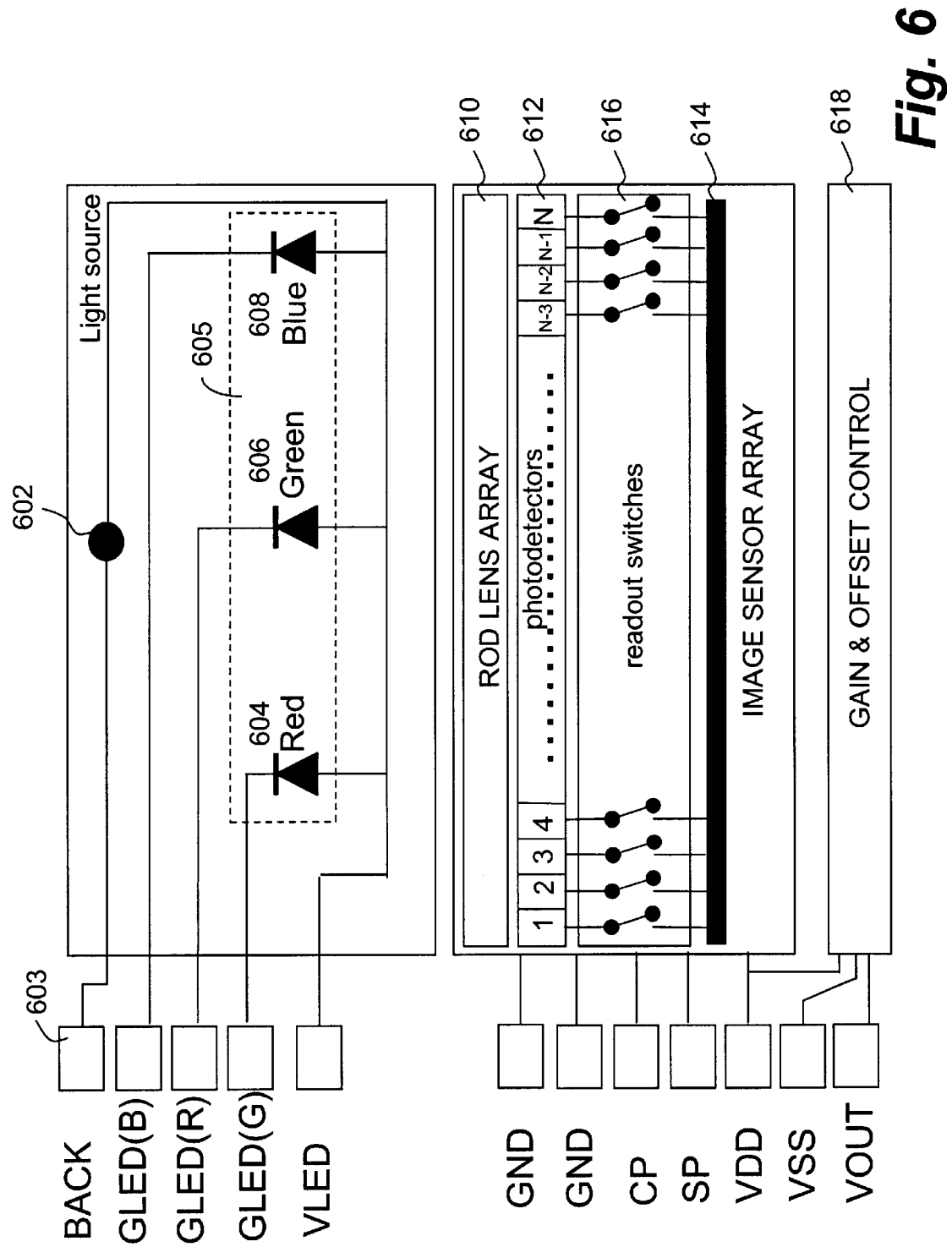
FIG. 6 illustrates an internal functional diagram of an image sensing module in one embodiment of the present invention.

To further understand the principles of the present invention, FIG. 6 shows an internal functional diagram of sensing module 300 according to one embodiment of the present invention. As illustrated, there are two illumination sources, first one 602 is for back illumination and second one 605 is for front illumination. The front illumination source comprises a red LED 604, a green LED 606 and a blue LED 608, each controlled respectively by a control signal, GLED, RLED or BLED at respective connectors 402, 404, and 406. The LED control signals GLED, RLED or BLED are provided from interface card 500 of FIG. 5.

For simplicity, back illumination source 602 is shown one light and one connector 603. Those skilled in the art understand that back illumination source 602 may be implemented with a single LED or a fluorescent light controlled by an "ON" signal at connector 603, and alternatively with three colored lights similar to red LED 604, green LED 606 and blue LED 608, in which case connector 603 should be implemented with three separate connectors, and the corresponding control signals may be provided from interface card 500 of FIG. 5. As described above, either illumination source 602 is turned "ON" for a transparent scanning object or the LEDs are successively turned "ON" for an opaque scanning object.

The rod lens array 610 collects either the reflected light from the opaque scanning object illuminated by one of red LED 604, green LED 606 and blue LED 608 or transmitted light from the transparent scanning object illuminated by back illumination source 602 and focuses the light onto image sensor 612. Image sensor 612 comprises, for example, N photodetectors. Each of the photodetectors collects light cast thereon during each integration process and generates a pixel signal. Upon the completion of the integration process, the pixel signals, each respectively generated by one of the photodetectors, are sequentially readout to the video bus 614 as a scanning signal via readout switch array 616 controlled by control signals from interface card 500 of FIG. 5. It should be noted that image sensor 612 is assumed a CMOS type sensor and those skilled in the art will understand that the description works the same for CCD type sensors.

Switch array 616 comprises the same number of the readout switches as the number of the photodetectors in the image array 120. It is understood to those skilled in the art that each of the readout switches may be implemented by a diode that becomes "On" or "passing through" when a proper voltage from interface card 500 of FIG. 5 is applied across. As shown in the figure, the scanning signal is coupled to a gain & offset control circuit 618. The scanning signal is processed, including amplified and offset, in gain & offset control circuit 618 with respect to a desired adjustment and subsequently output as a signal VOUt to interface card 500 of FIG. 5.

Figure 7A:
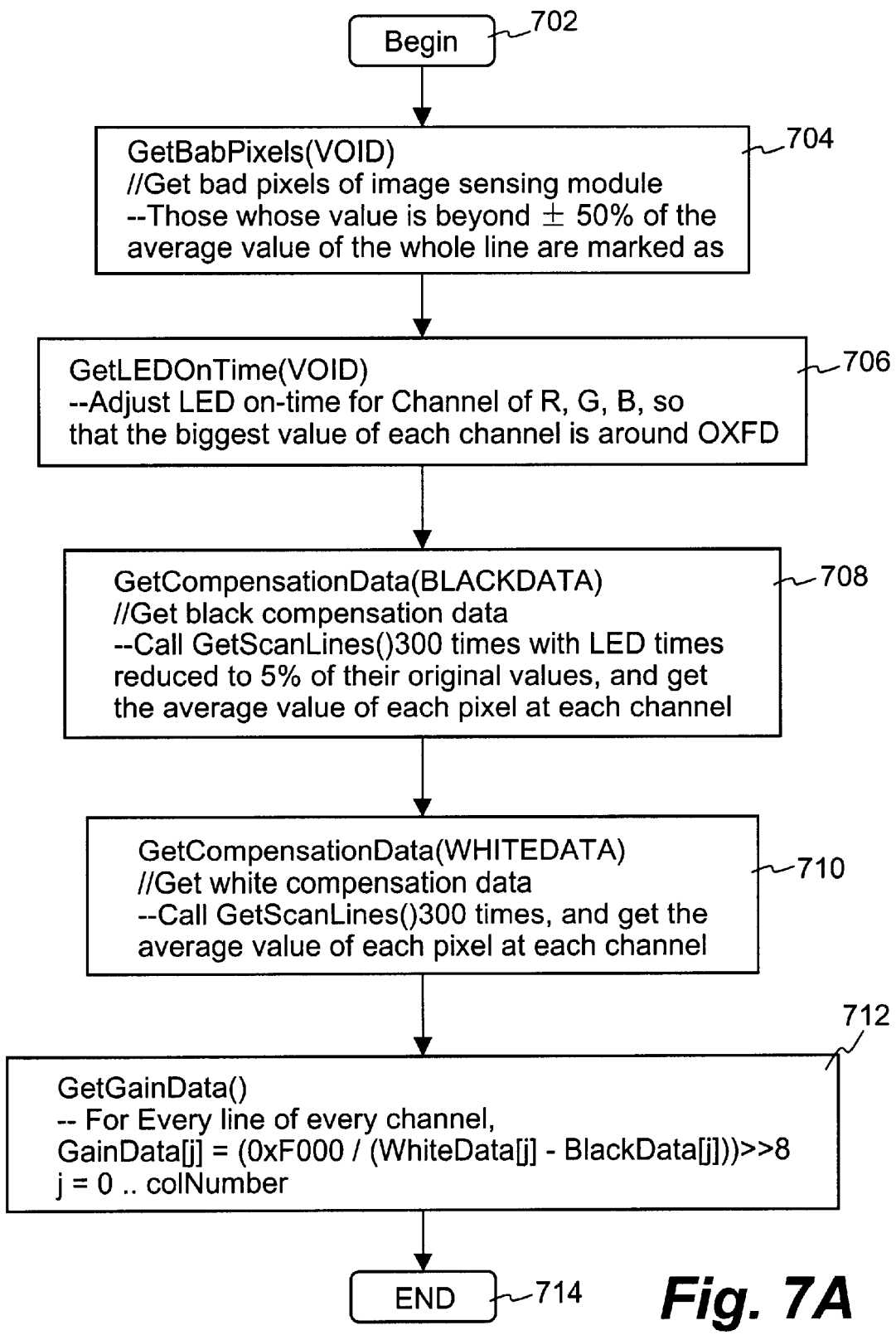
FIGS. 7A to 7C illustrate a flowchart of a process that is executed in a computing device to control the interface engine in FIG. 5.
Figure 7B:
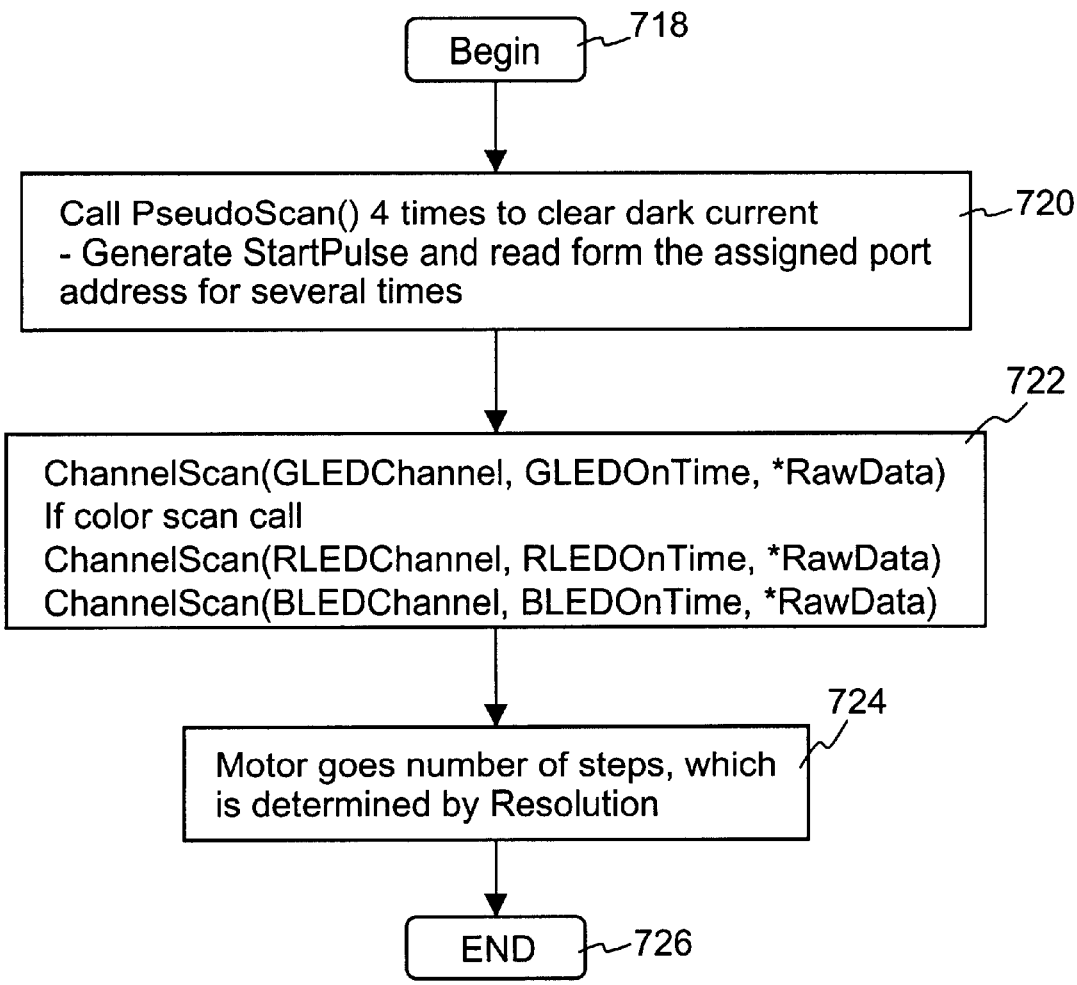
Figure 7C:
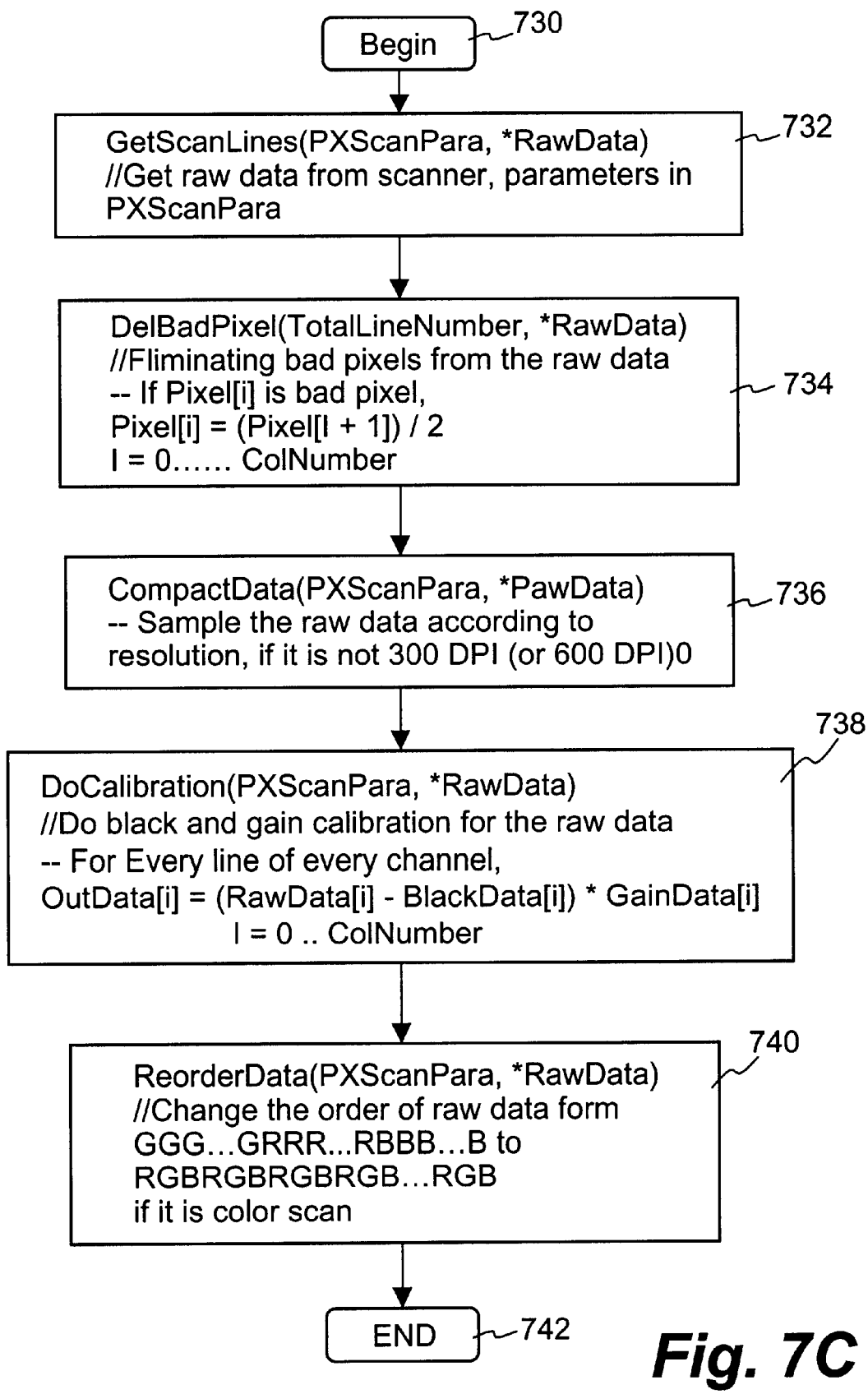

FIGS. 7A to 7C show flowcharts of the process that can be used to control the operation of the interface control card and subsequently of the image sensing module and the motion mechanism and should be understood in conjunction with FIG. 5. According to one embodiment of the present invention, a compiled and linked version of the process is executed in a computing device with which the scanner operates.

In FIG. 7A, the process starts with a calibration procedure to get various calibration data that will be used to refine image raw data during actual image acquisition. Because of various practical reasons, the image sensor in the image sensing module may not produce intensity signals or valid signals from all of the photodetectors. To avoid undesirable (bad) signals, at 704, one or more lines of scanning signals are acquired to detect if there are any bad signals in the acquired scanning signals. As described above, this is done through the interface engine that produces the digital signals of the scanning signals. If there are any digital signals that have values beyond ±50% of the average of the entire line of digital signals, these pixels are marked "bad".

At 706, the process is moved to get correct exposure times for the three respective colored lights. Typically, the three colored lights are red, green and blue light tubes stimulated by respective one or more red, green and blue LEDs. It is known that the sensitivity of the image sensor to the colors and the light intensities from the three colored lights are different. To avoid any biased illumination, a set of calibrated timing parameters must be derived from an actual test. There can be many ways to derive this set of timing parameters. According to one implementation, the set of timing parameters is derived with respect to the maximum values in the three respective lines of signals obtained under independent and respective illumination of the three colored lights.

At 708, the process is moved to obtain the most appropriate gain and offset from the actual signals. Preferably a few hundreds of lines of signals are acquired from the same scanning lines under the same lighting conditions (reduced to 5% of the adjusted full capacity). These signals are then averaged to derive an offset, referred to as BlackData, of each of the three colored lights. At 710, the process is moved to obtain the respective maximum values, referred to as WhiteData, from a few hundreds of lines of signals that are acquired under the same lighting conditions (adjusted full capacity). Hence a set of WhiteData and BlackData is obtained for each colored illumination.

At 712, the process is moved to calculate the gain value, referred to as GainData, with respect to the respective obtained set of WhiteData and BlackData.

FIG. 7B shows the process (image acquisition) with the control of the illumination source and motion mechanism. It should be noted herein that the process does not have to identify which illumination source is in operation. Typically, before the acquisition process starts, a cleanup procedure is executed at 720. The purpose of cleanup procedure is to ensure that no signal residues are in the image sensor. At 722, for every scanning line, the colored lights are respectively and successively turned on for a specific time by the respective exposure timing parameters obtained in the calibration process. To be specific with one implementation, the green light is kept "ON" for a duration of GLEDOntime, the red light is kept "ON" for a duration of RLEDOntime and the blue light is kept "ON" for a duration of BLEDOntime. Under each of the lighting condition, three lines of digital signals are respectively and subsequently obtained before the motion mechanism advances the scanning object for the next scanning at 724.

FIG. 7C shows the process for image acquisition. At 732, lines of image data are captured under the respective exposure timing parameters obtained in the calibration procedure. At 734, those marked "bad" signals are replaced using an average of neighbor signals.

Generally, the scanner is designed to scan at a fixed resolution, for example, 300 dpi or 600 dpi. If a user decides to have an image resolution other than what the scanner can provide, the scanned digital signals are extrapolated or interpolated at 736 to produce the desired resolution. Before the digital signals are finally output, for example, for display, the digital signals are corrected with the gain and offset obtained empirically before. At 740, the corrected digital signals (image pixels) are regrouped to comply with the traditional RGB data format.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

We claim:

1. A mobile scanner comprising:
    an image sensing module comprising:
        a one-dimensional image sensor array;
        a lens mounted in front of the image sensor array; and
        a first illumination source comprising three colored lights that are turned on independently and successively by an illumination control signal;
    a motion mechanism working in synchronization with the image sensing module, the motion mechanism causing a scanning document illuminated by the first illumination source to pass through the lens so that the scanning document is imaged by the image sensor array; and
    an interface module coupling the image sensing module and the motion mechanism to a computing device and receiving a power supply and system control signals from the computing device; the image sensing module and the motion mechanism receiving the power supply and illumination control signals from the interface module to operate.

2. The mobile scanner as recited in claim 1, wherein the image sensor array is energized by the power supply and controlled sensor control signals from the interface module.

3. The mobile scanner as recited in claim 2, wherein the image sensor array produces respectively three intensity signals when the three colored lights are turned on independently and successively by the illumination control signals.

4. The mobile scanner as recited in claim 3, wherein the three intensity signals are fetched into the interface module to produce three respective digital signals thereof.

5. The mobile scanner as recited in claim 4, wherein the interface module comprises an analog-to-digital converting circuit powered by the power supply from the computing device, the analog-to-digital circuit digitizing the three intensity signals respectively to produce the three respective digital signals.

6. The mobile scanner as recited in claim 5, wherein the digital signals are uploaded into the computing device for further processing.

7. The mobile scanner as recited in claim 1, wherein the interface module comprises:
a control circuit, the control circuit, receiving the system control signals from the computing device, generating:
the illumination control signals to control the operation of the first illumination source;
sensor control signals to control the operation of the image sensor array; and
motor control signals to control the operation of the motion mechanism synchronized with the operation of the first illumination source and the image sensor array; and
wherein the control circuit is energized by the power supply from the computing device.

8. The mobile scanner as recited in claim 7, wherein the system control signals are generated from the computing device operating a control process.

9. The mobile scanner as recited in claim 1, further comprising:
a second illumination source; and
a switch circuitry causing to switch the illumination control signal to control the operation of the second illumination source when the scanning document is transparent.

10. The mobile scanner as recited in claim 9, wherein the second illumination source provides back illumination to the scanning document.

11. The mobile scanner as recited in claim 9, wherein the switch circuitry comprises means for detecting whether the scanning document is transparent or opaque.

12. A mobile scanner comprising:
a compact house;
a color image sensing module housed in the compact house;
a motion mechanism housed in the compact house; the motion mechanism comprising a rubber-surfaced rod driven by a motor; the rubber-surfaced rod causing a scanning document to pass through the color image sensing module when the motor operates;
an interface card comprising an analog-to-digital circuitry; and
a multi-wire cable coupling the interface card to the color image sensing module so that imaging signals from the color image sensing module can be digitized in the interface card.

13. The mobile scanner as recited in claim 12, wherein the interface card receives a power supply and system control signals from a computing device when the interface card is received in a receptacle of the computing device, wherein the computing device operates a control process that causes the computing device to generate the system control signals.

14. The mobile scanner as recited in claim 13, wherein the control process is executed by a processor in the computing device and is caused to:
perform calibration procedures of the image sensing module via the interface card;
provide exposure timing parameters for an illumination source in the color image sensing module providing controlled illumination to the scanning document; and
synchronize motions of the motion mechanism.

15. The mobile scanner as recited in claim 14, wherein the interface card provides control signals in response to the system control signals to the color image sensing module and the motion mechanism to operate in synchronization.

16. The mobile scanner as recited in claim 15, wherein the interface card is a PC Card compliant with Personal Computer Memory Card International Association (PCMCIA).

17. The mobile scanner as recited in claim 16; wherein the color image sensing module comprises a first illumination source that further comprises three colored lights, the three colored lights are turned on independently and successively by three of the control signals from the interface card.

18. The mobile scanner as recited in claim 17; the mobile scanner further comprising:
a second illumination source; and
a switch circuitry for switching the three of the control signals from the first illumination source to the second illumination source.

19. The mobile scanner as recited in claim 18; wherein the switch circuitry comprises:
a light emitter and a photodetector, both being so aligned that the photodetector remains activated when a light ray from the light emitter falls on the photodetector, the photodetector becoming inactivated when an opaque scanning material is inserted between the photodetector and the emitter.

20. The mobile scanner as recited in claim 13; wherein the interface card comprises:
a control circuit, in response to the system control signals, producing:
an illumination control signal;
sensor control signals to control the operation of the image sensor array; and
motor control signals to control the operation of the motion mechanism synchronized with the operation of the first illumination source and the image sensor array.

21. The mobile scanner as recited in claim 20, the mobile scanner further comprising:
a base comprising a second illumination source, the base demountably mountable to the compact house so that the second illumination can provide back illumination when the scanning object is transparent.

22. The mobile scanner as recited in claim 21, wherein the second illumination source is controlled by the illumination control signal.

\* \* \* \* \*